April 18, 1944.   F. J. BILEK ET AL   2,346,649
BARREL TRUCK
Filed May 2, 1942   2 Sheets-Sheet 1
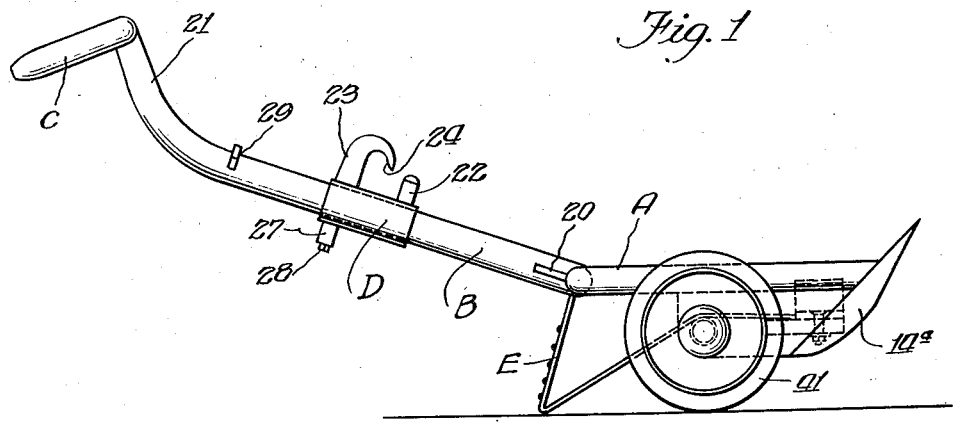
Fig. 1
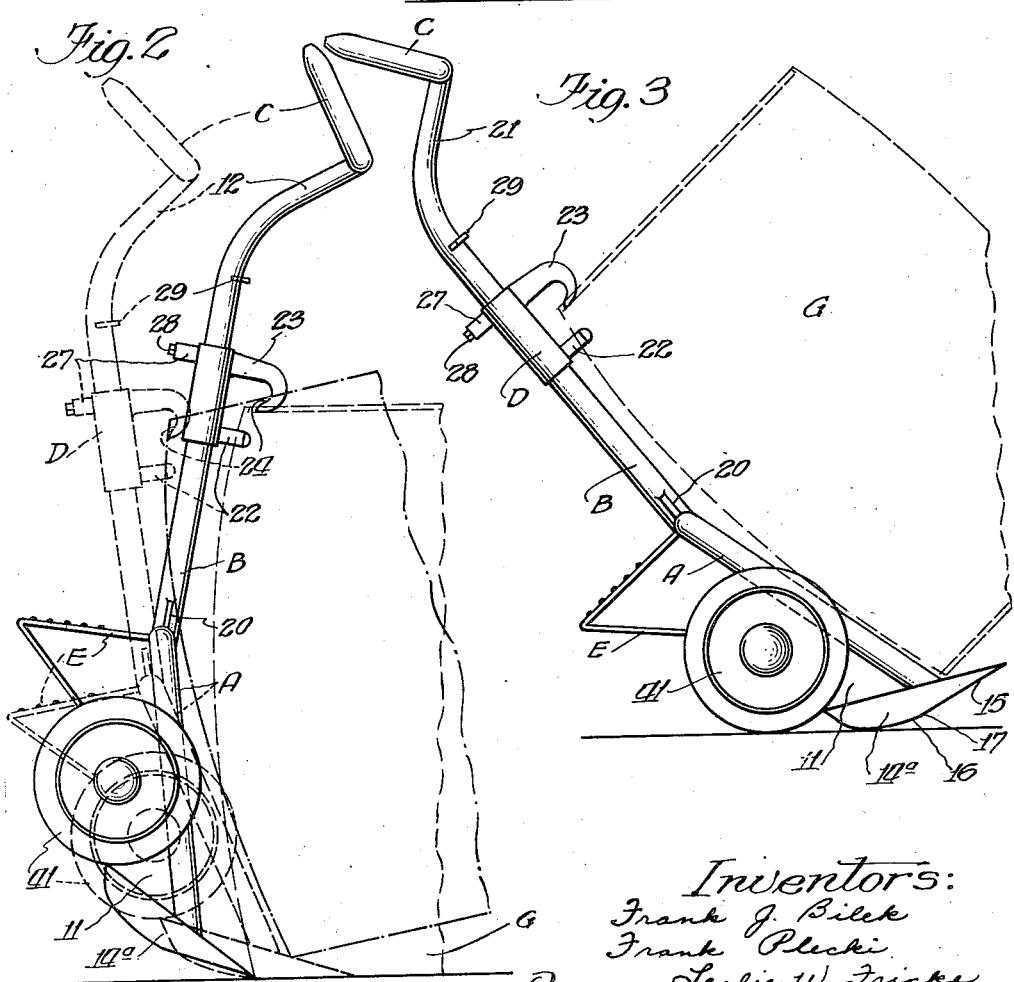
Fig. 2
Fig. 3
Inventors:
Frank J. Bilek
Frank Plecki
Leslie W. Fricke
By: Attorney.

April 18, 1944.   F. J. BILEK ET AL   2,346,649
BARREL TRUCK
Filed May 2, 1942   2 Sheets-Sheet 2
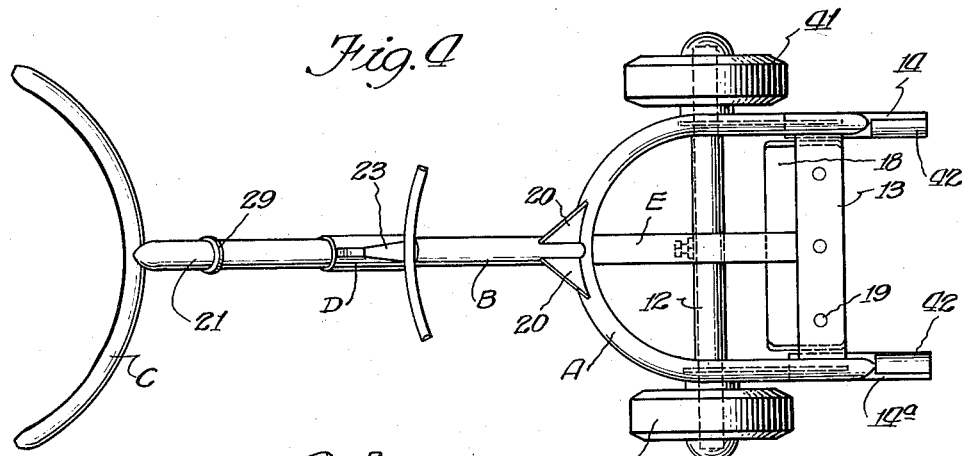
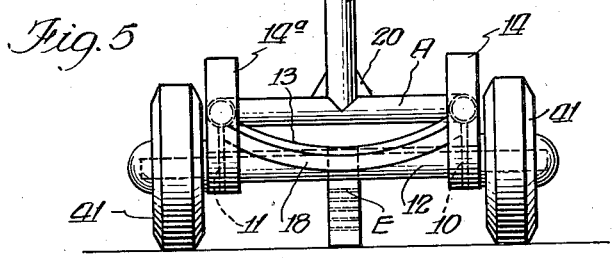
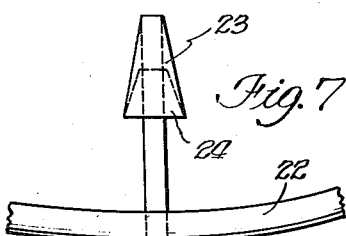
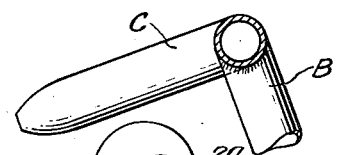
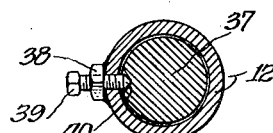
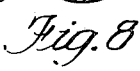
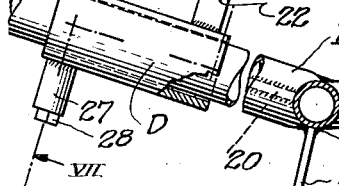
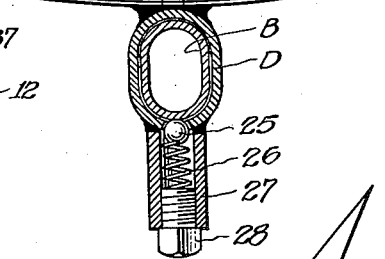
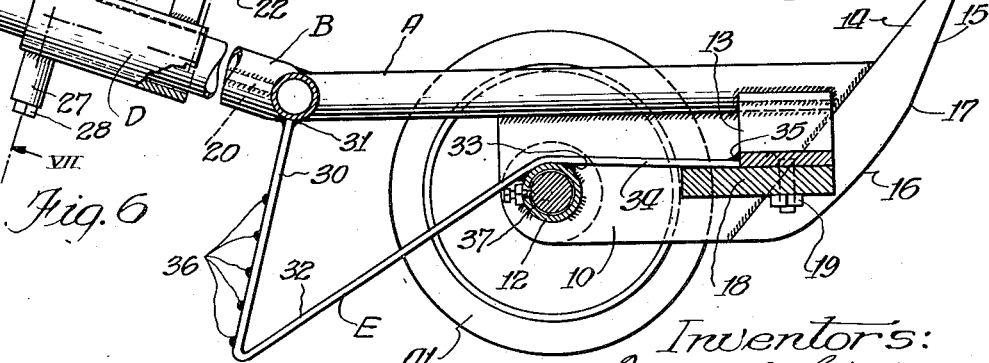
Inventors:
Frank J. Bilek
Frank Plecki
By: Leslie W. Fricke
Attorney.

Patented Apr. 18, 1944

2,346,649

UNITED STATES PATENT OFFICE 2,346,649

BARREL TRUCK

Frank J. Bilek and Frank Plecki, Chicago, Ill., assignors, by mesne assignments, to The Globe Company, (formerly Gambill Motor Company, Inc.), Chicago, Ill., a corporation of Illinois Application May 2, 1942, Serial No. 441,516

11 Claims. (Cl. 214—65.4)

Our invention relates to a barrel truck constructed for the convenient movement of barrels or drums.

The truck is designed to lift or to load and unload the heaviest loads from the floor onto and off the truck with minimum effort. It is unnecessary for the trucker to move or shift the barrel or drum to load it onto the truck or to unload it, as the truck is self-loading and unloading. The truck is balanced so that when transporting a load from place to place, pushing effort is about all that is required from the trucker.

An object of our invention is to provide a barrel truck which is balanced to relieve the trucker from lifting strain while loading and unloading barrels onto and off the truck and also while wheeling a loaded truck.

Another object of our invention is to provide a barrel truck which is designed to enable a trucker to pick up a heavy load with minimum effort, thereby lessening fatigue.

A further object of our invention is to provide a barrel truck arranged for automatic pick-up and unloading.

A further object of our invention is to provide a simple, inexpensive yet practical barrel truck for transporting barrels and drums from place to place, for example storage warehouses, loading and unloading of cars, ships, and the like.

A further object of our invention is to provide a barrel truck with counterweight means to retain it in substantially vertical position when idle and to balance it when in use.

Our invention has for a further object the provision of a barrel truck in which the fulcrum and weight, at the moment of picking up a barrel, is at the tip end of the truck, thus increasing the mechanical advantage of its construction to a maximum.

Our invention has for an additional object the provision of a barrel truck equipped with a removable axle so that it may be repaired or replaced in the event of wear or breakage.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a side elevational view of the truck in rest, recumbent or horizontal position with the leg on the floor;

Fig. 2 is a side elevational view of a truck showing in full lines its position when engaging a barrel for loading, with the handle end raised, with the wheels off the floor, and a barrel engaged by the chime hook ready to tip the barrel off its bottom for transportation, and in dotted lines its position when tipped back onto the flat portions of the prong shoes;

Fig. 3 is a side elevational view of the truck in normal or storage position, with the wheels and prong shoes on the floor and showing a barrel in place on the truck;

Fig. 4 is a top plan view of the truck;

Fig. 5 is an end view, with the standard or post broken away, looking at the right-hand end of the truck of Fig. 1;

Fig. 6 is a fragmental view, partially in vertical section and partially in elevation, showing details of construction and manner of welding some of the parts together;

Fig. 7 is an enlarged vertical sectional view taken in the plane of line VII—VII of Fig. 6; and Fig. 8 is a sectional view through the axle and axle housing showing one form of mechanism for retaining the axle in place in its housing.

The drawings will now be described.

It may be noted that the truck of our invention is of tubular construction and includes a frame A of U-shape in plan, a tubular post or standard B welded at one end to the middle of the U bend of the frame and extending upwardly therefrom at an obtuse angle, and a handle bar C welded to the upper end of the post.

Welded to the under sides of the legs of the frame A are plates 10 and 11 which extend down or depend from the legs and along the lengths of the same. The plates are apertured in register and a tubular member 12, constituting an axle housing, is welded in the apertures in the plates. A bowed cross member 13 is welded at its ends to the legs of the frame with the concavity below the legs of the frame. Welded to the ends of the plates 10 and 11 and the legs of the frame are prong shoes 14 and 14a. The upper surfaces of the shoes are straight and as welded in place make an obtuse angle with the plane of the frame, with the extremities of the shoes projecting beyond the upper or active surface of the frame. The upper or active ends of the shoes are wedge shape with the under surfaces of the shoes extending backwardly from the point in straight lines, making flat contact surfaces 15. The lengths of the flat surfaces 15 are less than the lengths of the shoes. Extending backwardly from the flat surfaces 15 are curved surfaces 16 merging into the top surfaces at the rear or lower ends of the shoes. The joints 17 between the flat surfaces 15 and the curved surfaces 16 constitutes fulcrum points in certain uses of the truck.

Bolted or riveted to the under surface of the cross member 13 is a counterweight 18 which is shown as rectangular in cross section and in end view curved to conform to the curvature of the cross member 13, as may be observed in Fig. 5. This counterweight is secured in place by rivets or bolts 19.

The post or standard B is made from tubular stock. Its lower end is notched so as to more easily be applied to the curved portion of the frame A for welding purposes. The end of the post is welded to the frame member and, as strengthening means, there are applied webs 20 which are welded to the post and to the frame. As may be observed in certain figures of the drawings, the upper portion of the post is bent upwardly, as at 21. The handle bar C which is of conventional form is welded to the extremity of the upper portion 21 of the post. The major portion of the post is straight. This portion is flattened into elliptical shape.

Prior to the time the post B is welded to the frame, a collar D is applied to it to slide along it. The collar is flattened similarly to the flattened portion of the post to conform to it to prevent rotative movement of the collar on the post. The lower end of the collar is provided with a cradle 22 which is arcuate in elevation and preferably made of half round stock to receive or support the upper end of a barrel on the truck. Near the other end of the collar a chime hook 23 is welded having a point 24 to engage over a barrel chime, as may be observed in Figs. 2 and 3. In order to retain the collar in adjusted position along the length of the post, suitable anti-friction means are provided. In the present instance the anti-friction means include a ball 25 urged by a spring 26 against the post. The ball and spring are retained in a column 27 formed as an integral part of the collar. An adjusting screw 28 threaded in the end of the column is utilized to adjust the tension of the spring 26 against the ball.

In order to prevent the collar from being slid up the post onto the curved portion thereof, a stop 29 is welded to the post adjacent the upper end of the straight part of the post.

In order to provide a leg or support for the truck, when in recumbent or substantially horizontal position, as shown in Fig. 1, a metallic strap E is utilized, extending lengthwise of the frame. Referring to Fig. 6 it is noted that one end of the strap has a straight portion 30, the upper end of which is welded at 31 to the frame A at the junction of the frame and post B. This straight portion 30 terminates, at its lower end, in an acute angle connection with an intermediate portion 32 which leads upwardly from the lower end of the portion 30 and over the axle housing 12, being welded to the housing at 33. A third portion 34 of the strap extends forwardly and at its end is welded at 35 to the cross member 13. This strap E in addition to affording a leg for supporting the truck, provides strength to the structure. The deflected portion 30 of the strap E is provided at different points in its length with rows 36 of welding for offering a roughened surface to the foot of a trucker when he steps on this strap to urge the points of the shoes underneath a barrel, as viewed in Fig. 2, and as an aid in tilting the loaded truck from the pick-up position to that shown in Fig. 3 when the center of gravity of the load is substantially over the axle.

An axle 37 is arranged within the housing 12 and is removably retained in position in the same.

Referring to Fig. 8, a nut 38 is welded to the exterior of the housing 12. The housing is bored in register with the nut opening. A set screw 39, having a point 40, is threaded through the nut and bore with its point entered in a suitably shaped recess in the axle. This set screw retains the axle against endwise displacement and against rotative movement.

Wheels 41 are held in place on the ends of the axle in any suitable manner, preferably by means of cotter pins passing through holes in the axle, retaining washers against the outer ends of the hubs of the wheels. The inner ends of the hubs of the wheels may bear against the outer surfaces of the side plates 10 or the plates may be provided with bosses to contact the hubs.

The position of the truck shown in Fig. 1 is herein referred to as the recumbent position or horizontal position. The position shown in Fig. 3 is referred to as the normal or storage position. The truck is so designed that it will remain in the substantially vertical or storage position shown in Fig. 3 loaded or unloaded, and when unloaded may be stored along with others of the same kind, utilizing a minimum of floor space.

The use of the truck is as follows:

A barrel, or drum G is to be picked up and moved by our truck. The trucker moves the truck with the extremities of the prong shoes against the lower chime of the barrel and the floor, raising the handle end up until the chime hook 23 engages over the upper chime of the barrel, the collar D being slid along the post to cause engagement of the hook with the chime. In this position the handle bar is over the upper end of the barrel and the extremities of the prong shoes are at the junction of the barrel and floor, and the wheels are off the floor. It will be noted that the fulcrum is at the extremities of the prong shoes at the moment of pick-up. When the chime hook is engaged over the upper end of the barrel, the trucker pulls the handle bar toward him, which would be towards the left, and with one foot on the step of the strap E forces the extremities of the prong shoes underneath the barrel. The truck is swung until the flat surfaces 15 of the prong shoes are flat on the floor. If desired, the truck and load may be left in this position. If not, the trucker swings the truck on the joints 17 of prong shoes as a fulcrum, transferring the load to and rocking it on the curved surfaces 16 thereof until the wheels engage the floor, which is the normal or storage position shown in Fig. 3. By the time the truck has reached this position, the center of gravity of the load has approached the vertical axis through the axle of the truck. The trucker then lowers the handle, raising the prong shoes from the floor, and trundles the truck and its load as desired. Because of the construction of the truck, little effort is required to maintain balance of the truck and load, thus making it possible for the trucker to apply all of his effort to movement of the truck.

When the unloading station is reached, the handle bar is raised until the prong shoes engage the floor and wheels are raised from the floor, the truck rocking on the prong shoes, and as the truck reaches substantially the dotted line position shown in Fig. 2, i. e. with the flat surfaces 15 of the shoes on the floor, the lower end of the barrel will slide off the prong shoes thus releasing itself from engagement with the chime hook, whereupon the truck may be withdrawn.

Because of the fact that immediately prior to unloading a barrel from the truck the barrel is substantially erect, it drops off the shoes and lodges where it is. As little or no space is needed, other than that necessary for the barrel itself, the truck may be moved closely adjacent the place of barrel deposit. Hence the barrels may be placed against a wall, or against a row of barrels, without sacrifice of floor space.

It will be observed that a barrel may be picked up, moved and unloaded without the necessity of the trucker having to tilt the barrel, or even touch it.

To facilitate projection of the prong shoes underneath a barrel, the chime engaging surfaces of the shoes are chamfered along their inner margins, the chamfer increasing in depth rearwardly from the tips, as at 42. The wedge shape of the shoes and the chamfer thereof make possible easy insertion of the shoes under a barrel.

It might be noted, in explanation of the balance feature of our invention, that a girl weighing 120 pounds, using one of our trucks, loaded, moved and unloaded a barrel which with its contents weighed in the neighborhood of 600 pounds, and a man picked up an 1100 pound barrel.

In swinging a truck with a barrel on it from pick-up position (Fig. 2) to storage position (Fig. 3), it will be noted that the fulcrum of the lever system is close to the bottom of the load so that the wide swinging movement of the handle bar of the truck will raise the load but slightly from the floor. As a matter of fact, in raising a barrel from pick-up position to that of Fig. 3, the lowermost point of the barrel is raised a distance of approximately 3 inches. The fulcrum means for this movement comprises the prong shoes.

Because of this fulcrum action of our truck, the effort that the trucker must exert is minimized, as the effort he exerts on the handle bar is a pulling effort and not a prying effort. The load arm is short and the power arm is long.

To swing the truck and barrel to trundle position requires little effort.

The horizontal position of the truck (Fig. 1) is especially advantageous when weighing a barrel on the truck, for rest while the trucker is awaiting his turn to unload, or for applying stencils, labels, or the like, to either or both of the barrel heads.

We believe that the mechanical advantages of our construction are readily apparent.

We wish it to be understood that our invention is not limited to the specific constructions shown and described, except so far as certain of the claims may be so limited, as it will be apparent to those skilled in the art that changes in the constructions and arrangements may be made without departing from the principles of our invention.

We claim:

1. A barrel truck including a U-shaped frame, side plates welded to the legs of the frame in depending positions, an axle housing extending transversely of the frame and welded to said plates, an axle in said housing, means constraining said axle against endwise movement, wheels on the ends of the axle, a bowed cross member welded at its ends to the legs of the frame and disposed therein ahead of the axle, a tubular post having the major portion of its length of elliptical cross section welded at one end to the middle of the curved portion of the frame and extending therefrom upwardly at an obtuse angle, a handle bar at the upper end of said post, a tubular member slidable along said post and being of similar elliptical cross section to maintain said member in predetermined angular position on said post, a chime hook fixed to said member at one end thereof and a barrel cradle fixed to said member at the other end thereof, means providing frictional engagement between said member and the post to hold said member in adjusted position on the post, a step plate welded at one end to the frame at the junction of the post and at an intermediate part to the axle housing and at its other end to said bowed cross member, said plate being bent between its connection to the frame and axle to form a prop for said truck when the latter is in a substantially horizontal position and to constitute a step for engagement by the trucker when tilting the truck, prong hooks welded to the forward ends of said side plates and to the extremities of the frame legs and having wedge-like ends above the plane of said frame and adapted to engage beneath the lower chime of a barrel when the truck is raised upwardly on said prong hooks as a fulcrum to enable engagement of said chime hook with the upper chime of the barrel, the lower margins of said prong hooks being shaped to constitute rocker surfaces useful as fulcra as the handle end of the truck is swung downwardly after the prongs and chime hooks have engaged the barrel to thereby support the barrel on the truck and to enable transportation thereof on the truck.

2. A two-wheel barrel truck of the class described having a U-shaped frame and having a post secured to the middle of the bend of said frame and extending therefrom at an obtuse angle, side plates welded to and depending from the legs of said frame, a tubular axle housing extending transversely of and welded to said plates, axle means within said housing, means carried by said housing and engaging said axle to constrain it against endwise movement, wheels journaled on said axle means, a bowed member arranged transversely of the frame with its ends welded to the legs thereof adjacent the free ends of the same, a strap member welded to said bowed member and to said axle housing and to said frame member and having a deflected portion between the housing member and its connection to the frame constituting a leg or support for the truck when in a horizontal position.

3. A barrel truck comprising a tubular frame of U-shape in plan, a cross member welded to the legs of the U member near the ends thereof and being bowed downwardly, vertical plates welded to the underneath portions of said legs and extending along the same, said plates having registering apertures, a tube welded in said apertures and constituting an axle housing, said tube having an opening in it, a nut welded to said tube in register with said opening, an axle in said tube, a screw threaded in said nut and engaging a recess in said axle to retain the same in place in the housing, wheels on the ends of the axle, prong shoes welded to the ends of said legs and said plates and having extremities projecting beyond said U-shaped frame, a single post welded at one end to the U of said frame and a handle bar welded to the other end of said post, a collar slidable along said post, said collar and post being flattened to substantially elliptical cross section to prevent oscillation of the collar on the post, a chime hook welded to the collar near its upper end and a barrel cradle bar welded to the collar near its other end, and said collar having means for frictionally engaging the post to hold the collar in adjusted position along the post.

4. A two-wheel barrel truck having a U-shaped tubular frame with the frame legs extending toward the pickup end of the truck, a bowed cross member welded at its ends to said legs near the ends thereof to constitute the front member of the frame, and a counterweight supported by said member.

5. A two-wheel barrel truck having a U-shaped tubular frame with the frame legs extending toward the pickup end of the truck, a bowed cross member welded at its ends to said legs near the ends thereof to constitute the front member of the frame, a reinforcing member extending lengthwise of the frame and welded at one end to the curved portion of the U and at the other end to said front member, said reinforcing member having an intermediate bent portion constituting a leg engageable with the floor to maintain the truck in substantially horizontal position to present the handle bar portion thereof at a height convenient for handy prehension by a trucker, said bent portion adapted to be engaged by the foot of the trucker to force the prongs underneath a barrel when the truck is upended along a barrel.

6. A two-wheel barrel truck having a U-shaped tubular frame with the frame legs extending toward the pickup end of the truck, a bowed cross member welded at its ends to said legs near the ends thereof to constitute a front member of the frame, side plates welded to said legs and extending downwardly therefrom, a tubular axle housing member between said plates welded thereto with its ends opening outwardly of said plates, a removable wheel supporting axle in said housing, and means carried by the housing for constraining said axle from endwise and rotative movement.

7. A two-wheel barrel truck having a U-shaped tubular frame with the frame legs extending toward the pickup end of the truck, a bowed cross member welded at its ends to said legs near the ends thereof to constitute the front member of the frame, side plates welded to said legs and extending downwardly therefrom, a tubular axle housing member between said plates and welded thereto with its ends opening outwardly of said plates, a reinforcing member extending lengthwise of the frame and welded at one end to the curved portion of the U and at the other end to said front member and at an intermediate point to said housing member, said reinforcing member having a deflected portion between its said one end and said housing member constituting a leg, and screw means threaded into said axle housing and entered in recess means in said axle to restrict movement of the axle with respect to the housing.

8. A two-wheel barrel truck having a U-shaped frame with the frame legs extending toward the pickup end of the truck, a post welded at one end to the yoke of said U-shaped frame, a handle bar secured to the other end of said post, a cross member extending transversely of said frame and welded to the front ends of said frame legs, a tubular axle housing extending across said frame intermediate said cross member and the yoke end of said frame, and a metal strap extending lengthwise of the frame and welded at one end to said cross member, at the other end to said yoke of said frame, and at an intermediate point in its length to said axle housing to provide endwise rigidity for the truck.

9. A two-wheel barrel truck having a U-shaped tubular frame with the frame legs extending toward the pickup end of the truck, a tubular post welded at one end to said frame, a tubular handle-bar welded to the other end of said post, a tubular axle housing, a bowed cross member welded at its ends to said legs near the ends thereof, and a metal strap extending lengthwise of the frame welded at one end to the frame and welded at an intermediate point in its length to the housing and at its other end to said cross member.

10. A two-wheel barrel truck having a U-shaped frame with the frame legs extending toward the pickup end of the truck, a cross member welded at its ends to said legs near the ends thereof to constitute the front member of the frame, and a counterweight supported by said member.

11. A two-wheel barrel truck having a U-shaped frame with the frame legs extending toward the pickup end of the truck, a cross member welded at its ends to said legs near the ends thereof to constitute the front member of the frame, a counterweight supported by said member, a handle member secured to the yoke of said U-shaped frame, and an axle housing extending transversely of said frame and welded to the legs thereof intermediate said handle member and said counterweight.

FRANK J. BILEK.
FRANK PLECKI.